United States Patent
Oshita et al.

(10) Patent No.: US 7,331,900 B2
(45) Date of Patent: Feb. 19, 2008

(54) SHIFT CONTROL APPARATUS AND METHOD FOR CONTINUOUSLY VARIABLE TRANSMISSION

(75) Inventors: Hideki Oshita, Yokohama (JP); Hiroyasu Tanaka, Kanagawa (JP); Takuichiro Inoue, Kanagawa (JP); Youhei Ishikawa, Kanagawa (JP); Kousuke Abe, Yokohama (JP)

(73) Assignee: Jatco Ltd, Shizuoka (JP)

( * ) Notice: Subject to any disclaimer, the term of this patent is extended or adjusted under 35 U.S.C. 154(b) by 185 days.

(21) Appl. No.: 11/230,520

(22) Filed: Sep. 21, 2005

(65) Prior Publication Data

US 2006/0063641 A1     Mar. 23, 2006

(30) Foreign Application Priority Data

Sep. 22, 2004  (JP) .............................. 2004-275620

(51) Int. Cl.
   *F16H 61/662* (2006.01)
(52) U.S. Cl. .......................... 477/45; 477/48; 477/906
(58) Field of Classification Search ................. 477/44, 477/45, 48, 50
   See application file for complete search history.

(56) References Cited

U.S. PATENT DOCUMENTS 5,334,102 A * 8/1994 Sato ............................ 474/18
6,077,187 A    6/2000 Suzuki et al.

FOREIGN PATENT DOCUMENTS

JP          11-030327 A     2/1999

* cited by examiner

Primary Examiner—Sherry Estremsky
Assistant Examiner—Edwin A Young
(74) Attorney, Agent, or Firm—Foley & Lardner LLP (57) ABSTRACT

The shift control apparatus for a continuously-variable transmission includes a primary pulley; a secondary pulley connected with the primary pulley by a belt; a shift actuator that varies a speed ratio; a line pressure adjusting that adjusts a line pressure; a secondary-pressure adjusting section that adjusts a secondary pressure; and a control section that controls the shift actuator, the line pressure adjusting section, and the secondary-pressure adjusting section. Moreover, the control section includes a fail determining section that determines whether the shift actuator is under a failed condition. The control section carries out a fail-safe shift-actuator fixing control to fix the shift actuator, when the fail determining section determines that the shift actuator is under the failed condition, and carries out a fail-safe hydraulic control to bring the line pressure to its upper limit pressure and bring the secondary pressure to its maximum pressure, when a control-start criterion predetermined to secure driving performance of the vehicle is satisfied under the failed condition.

14 Claims, 5 Drawing Sheets

SHIFT CONTROL APPARATUS AND METHOD FOR CONTINUOUSLY VARIABLE TRANSMISSION

BACKGROUND OF THE INVENTION a) Field of the Invention

The present invention relates to shift control apparatus and method for a continuously-variable transmission.

b) Description of the Related Art

In a previously proposed shift control apparatus for a belt-type continuously-variable transmission (or V-belt continuously-variable transmission, hereinafter simply referred to as continuously-variable transmission), an optimum target speed ratio is calculated in accordance with driving condition of the vehicle, and then a shift control valve is adjusted to a stroke position corresponding to the target speed ratio, by operating a stepping motor or a servomotor from a speed ratio command according to the target speed ratio. By means of this operation, the shift control valve produces and outputs a shift control hydraulic pressure corresponding to the target speed ratio. Thus, the continuously-variable transmission shifts toward the target speed ratio, in response to the shift control pressure. Thereby, stepless shift of the continuously-variable transmission is achieved.

A Japanese Patent Application Provisional Publication No. H11(1999)-30327 published on Feb. 2, 1999 exemplifies a previously proposed technique in a vehicle equipped with the continuously-variable transmission. In this technique, if the shift control system of a shift actuator for the continuously-variable transmission is under abnormal condition, the speed ratio is fixed to its value at the instant of determination of the abnormal condition.

SUMMARY OF THE INVENTION

In the above-described technique, when the shift control system of the shift actuator fails, the speed ratio is fixed. Hence the occurrence of abrupt down-shift can be avoided. However, when the vehicle is running under the condition of relatively high speed ratio (i.e., speed ratio for relatively high velocity of the vehicle), the speed ratio is fixed at its current value, i.e., the high speed ratio. Hence, a start performance of the vehicle deteriorates, when the vehicle starts after coming to a full stop.

It is, therefore, an object of the present invention to provide shift control apparatus or method for a continuously-variable transmission in the case where the shift actuator of the continuously-variable transmission fails.

According to one aspect of the present invention, there is provided a shift control apparatus for a continuously-variable transmission, comprising: a primary pulley coupled with an engine for a vehicle, and adapted to vary groove width thereof in accordance with hydraulic pressure within a primary chamber; a secondary pulley connected with the primary pulley by a belt, and adapted to vary groove width thereof in accordance with hydraulic pressure within a secondary chamber; a shift actuator adapted to vary a speed ratio by varying the groove width of at least one of the primary pulley and the secondary pulley; a line pressure adjusting section adapted to adjust a line pressure from which the hydraulic pressures within the primary and secondary chambers are produced; a secondary-pressure adjusting section adapted to adjust a secondary pressure corresponding to the hydraulic pressure within the secondary chamber, on the basis of the line pressure; and a control section configured to control the shift actuator, the line pressure adjusting section, and the secondary-pressure adjusting section, the control section including a fail determining section configured to determine whether the shift actuator is under a failed condition, and the control section being configured to carry out a fail-safe shift-actuator fixing control to fix the shift actuator, under the condition where the fail determining section determines that the shift actuator is under the failed condition, and being configured to carry out a fail-safe hydraulic control to bring the line pressure to its upper limit pressure and bring the secondary pressure to its maximum pressure, under the condition where a control-start criterion predetermined to secure driving performance of the vehicle is satisfied at the time of the failed condition.

According to another aspect of the present invention, there is provided a shift control apparatus for a continuously-variable transmission, comprising: a primary pulley coupled with an engine for a vehicle, and adapted to vary groove width thereof in accordance with hydraulic pressure within a primary chamber; a secondary pulley connected with the primary pulley by a belt, and adapted to vary groove width thereof in accordance with hydraulic pressure within a secondary chamber; shift actuating means for varying a speed ratio by varying the groove width of at least one of the primary pulley and the secondary pulley; line pressure adjusting means for adjusting a line pressure from which the hydraulic pressures within the primary and secondary chambers are produced; secondary pressure adjusting means for adjusting a secondary pressure corresponding to the hydraulic pressure within the secondary chamber, on the basis of the line pressure; and control means for controlling the shift actuating means, the line pressure adjusting means, and the secondary-pressure adjusting means, the control means including fail determining means for determining whether the shift actuating means is under a failed condition, and the control means being configured to carry out a fail-safe shift-actuator fixing control to fix the shift actuating means, under the condition where the fail determining means determines that the shift actuating means is under the failed condition, and being configured to carry out a fail-safe hydraulic control to bring the line pressure to its upper limit pressure and bring the secondary pressure to its maximum pressure, under the condition where a control-start criterion predetermined to secure driving performance of the vehicle is satisfied at the time of the failed condition.

According to still another aspect of the present invention, there is provided a shift control method for a continuously-variable transmission including: a primary pulley coupled with an engine for a vehicle, and adapted to vary groove width thereof in accordance with hydraulic pressure within a primary chamber; a secondary pulley connected with the primary pulley by a belt, and adapted to vary groove width thereof in accordance with hydraulic pressure within a secondary chamber; and a shift actuator adapted to vary a speed ratio by varying the groove width of at least one of the primary pulley and the secondary pulley, the shift control method comprising: determining whether the shift actuator is under a failed condition; carrying out a fail-safe shift-actuator fixing control to fix the shift actuator, when the shift actuator is under the failed condition; determining whether a control-start criterion predetermined to secure driving performance of the vehicle is satisfied at the time of the failed condition; and carrying out a fail-safe hydraulic control to bring a line pressure from which the hydraulic pressures within the primary and secondary chambers are produced, to its upper limit pressure, and to bring hydraulic pressure within the secondary chamber to its maximum pressure, under the condition where the control-start criterion is satisfied at the time of the failed condition.

The other objects and features of this invention will become understood from the following description with reference to the accompanying drawings.

DETAILED DESCRIPTION OF THE INVENTION

Reference will hereinafter be made to the drawings in order to facilitate a better understanding of the present invention.

Figure 1:
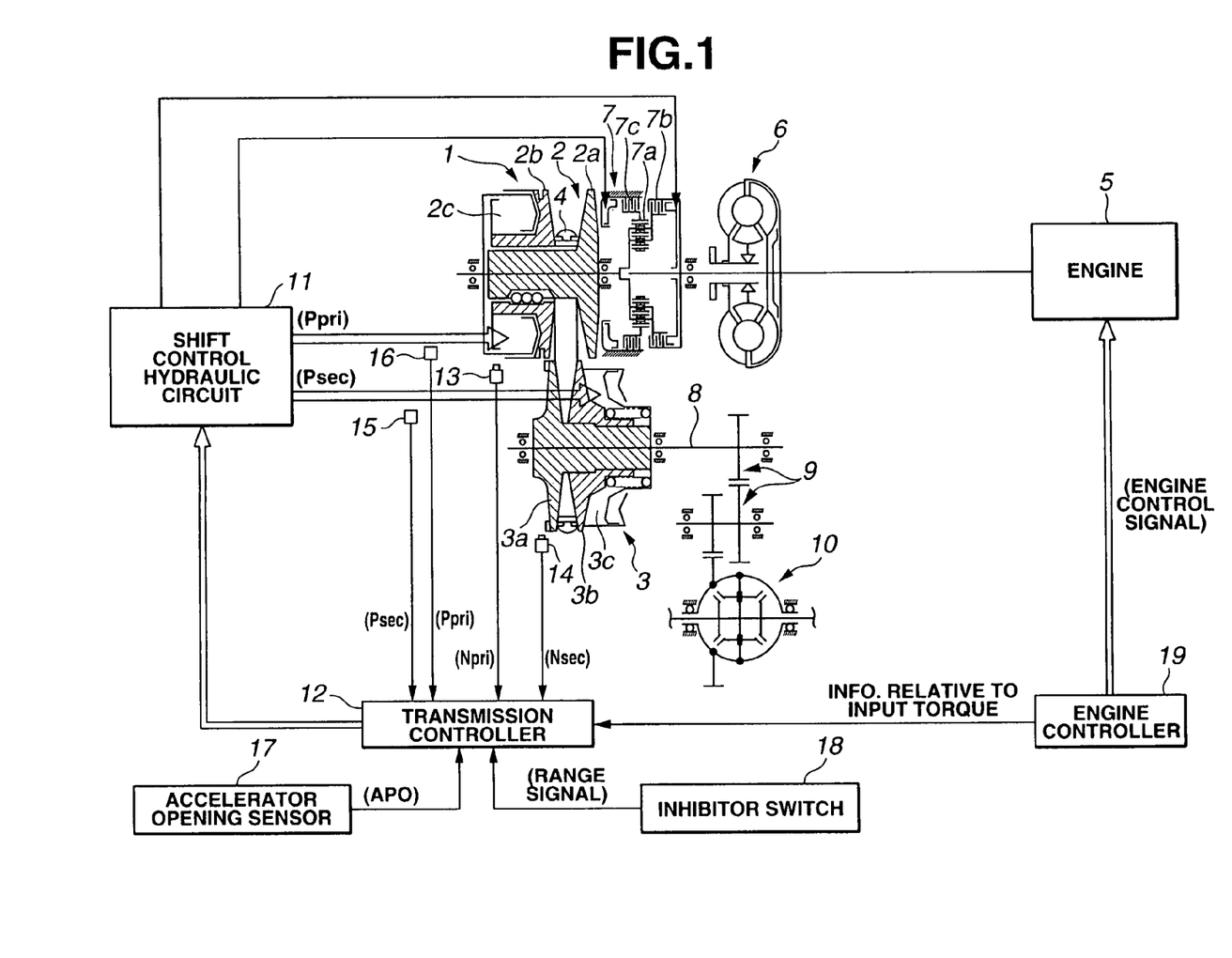
FIG. 1 is a schematic diagram representing a configuration of a continuously-variable transmission and its shift control system, in a shift control apparatus of one embodiment according to the present invention.
Figure 2:
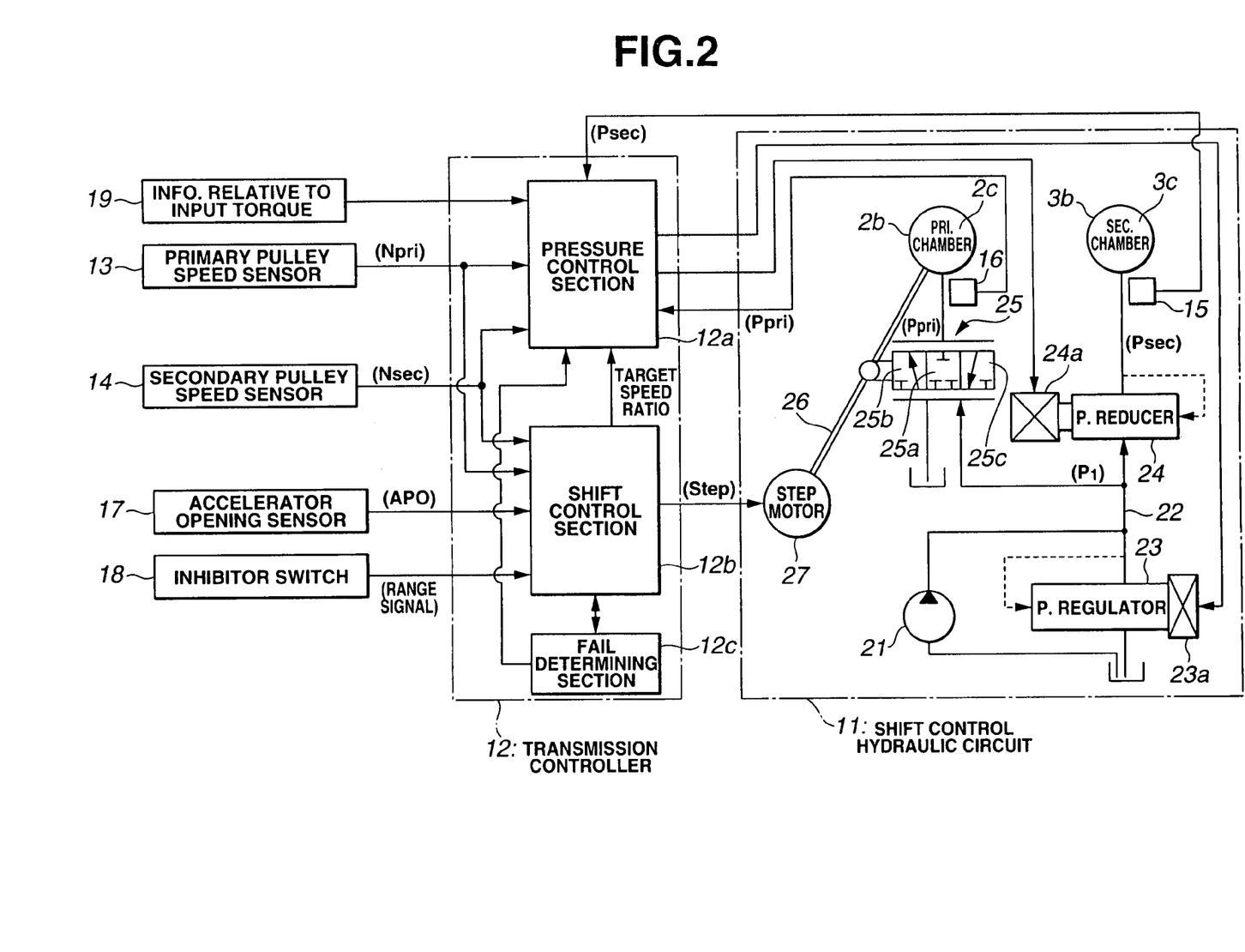
FIG. 2 is a schematic block diagram representing the shift control system in the embodiment according to the present invention.
Figure 3:
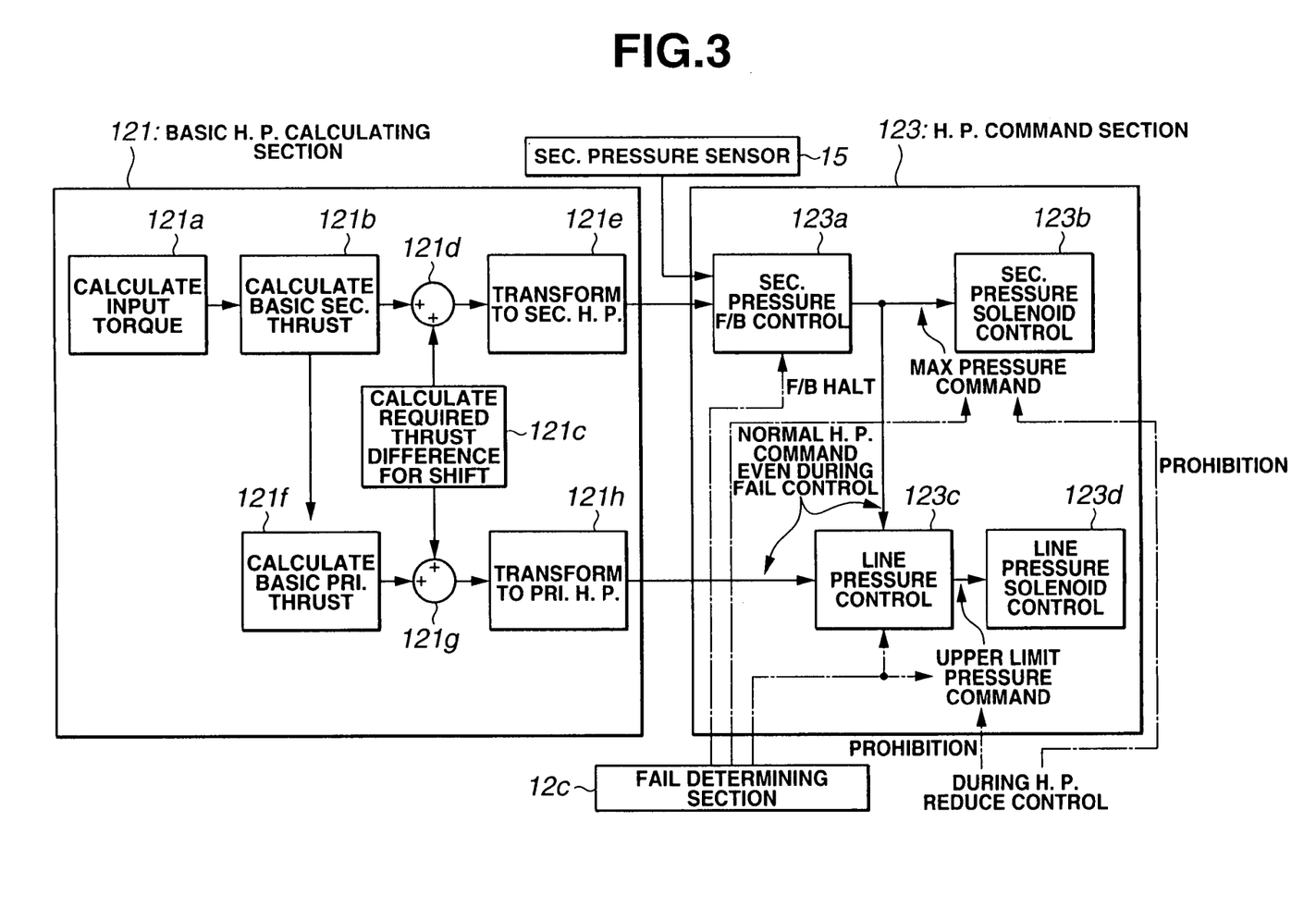
FIG. 3 is a schematic block diagram representing a functional configuration of the shift control system.
Figure 4:
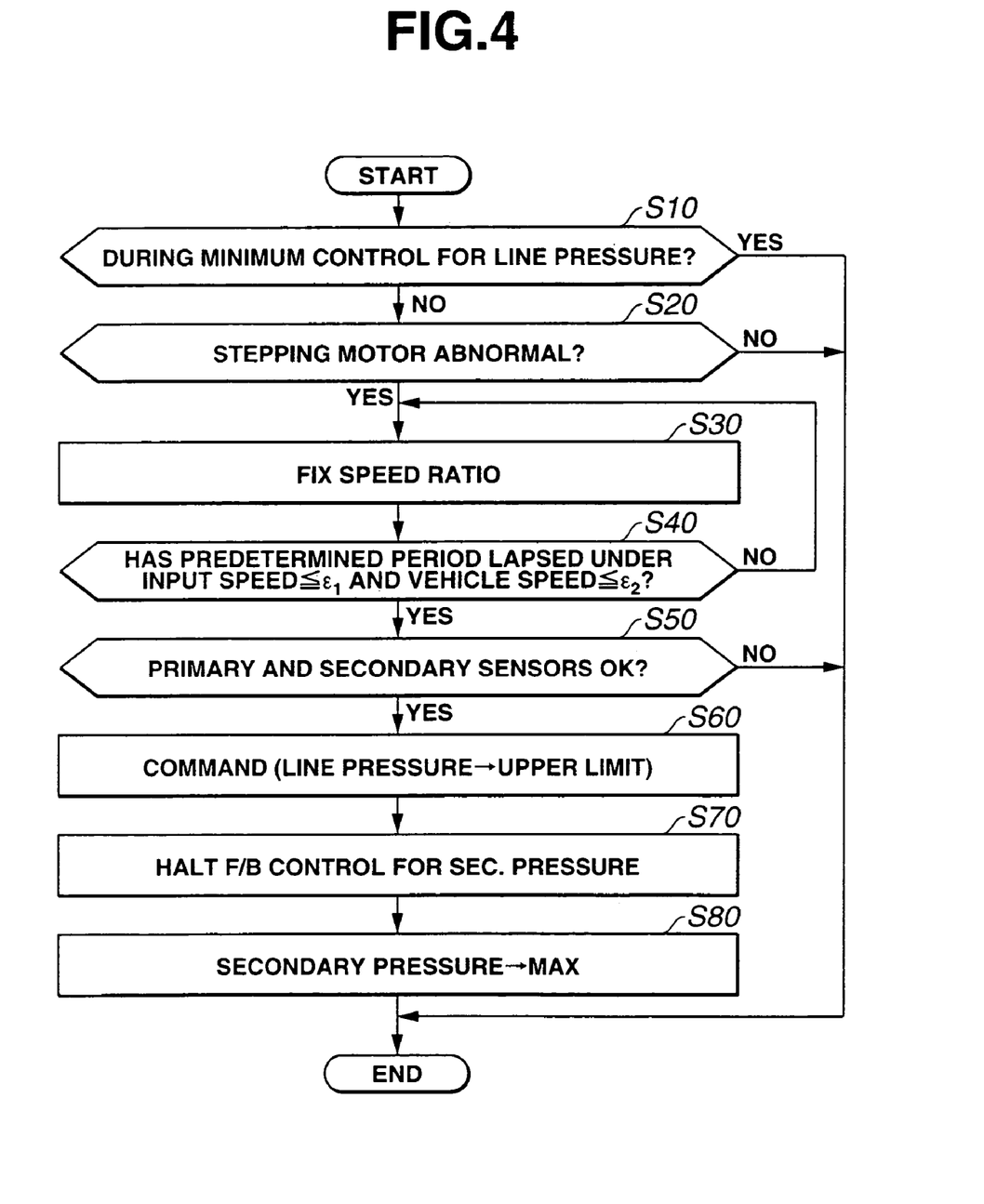
FIG. 4 is a flowchart showing control process of a fail-safe shift control in the embodiment according to the present invention.
Figure 5:
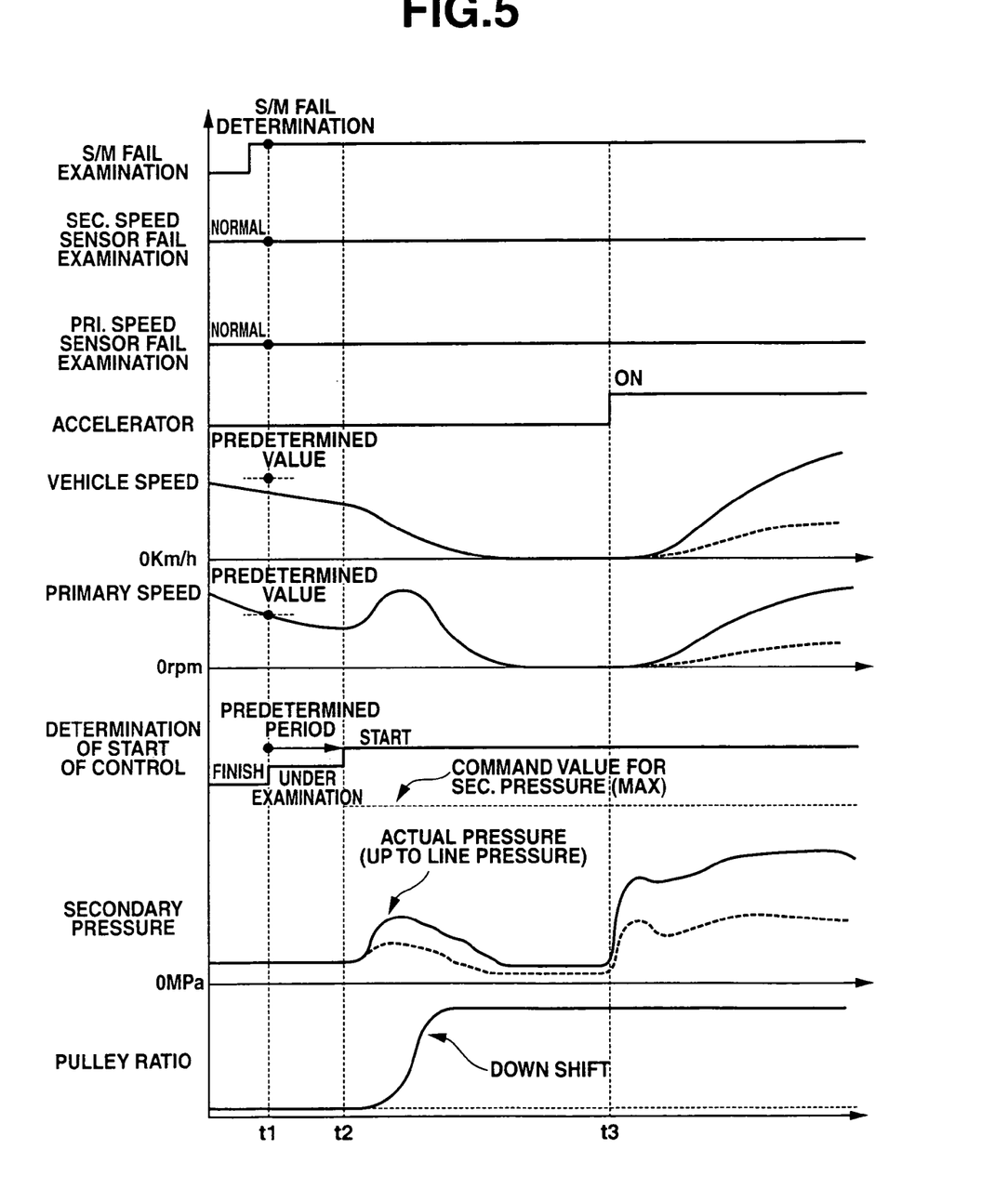
FIG. 5 is a time chart representing the fail-safe shift control in the embodiment according to the present invention.

FIGS. 1~5 show a shift control apparatus for a continuously-variable transmission in one embodiment according to the present invention. FIG. 1 is a schematic diagram representing a configuration of the shift control apparatus of this embodiment. FIG. 2 is a schematic block diagram representing a control system of the shift control apparatus of the embodiment. FIG. 3 is a schematic block diagram representing a functional configuration of the shift control system. FIG. 4 is a flowchart showing a control process of the shift control (as a fail-safe operation). FIG. 5 is a time chart representing the shift control (as a fail-safe operation). In addition, characters referring to signals such as detection signal or control signal are enclosed in parentheses in FIGS. 1 and 2.

At first, a schematic configuration of a belt-type continuously-variable transmission 1 according to this embodiment will now be explained. This belt-type continuously-variable transmission 1 includes a primary pulley 2, a secondary pulley 3, and a non-terminated V-belt 4, as shown in FIG. 1. Each of primary pulley 2 and secondary pulley 3 includes a corresponding V-shaped pulley groove, and then primary pulley 2 and secondary pulley 3 are arranged to neatly align the grooves thereof. Moreover, V-belt 4 is wound between two V-shaped grooves of primary pulley 2 and secondary pulley 3. Namely, primary pulley 2 and secondary pulley 3 are connected by V-belt 4 running therebetween. An engine 5 is arranged to be coaxial with primary pulley 2, and then a lock-up torque converter 6 and a forward-reverse switching mechanism 7 are disposed in this sequential order from the side of engine 5, between engine 5 and primary pulley 2.

Forward-reverse switching mechanism 7 includes a double-pinion-type planetary gear train (or, mechanism) 7a. A sun gear of double-pinion-type planetary gear train 7a is coupled with engine 5 through torque converter 6, and a carrier of double-pinion-type planetary gear train 7a is coupled with primary pulley 2. Forward-reverse switching mechanism 7 moreover includes; a forward clutch 7b which couples the sun gear of double-pinion-type planetary gear train 7a, directly with the carrier of that; and a reverse brake 7c which fixes a ring gear of double-pinion-type planetary gear train 7a (to a casing of forward-reverse switching mechanism 7). Forward-reverse switching mechanism 7 is configured to transmit input rotation (torque) inputted through torque converter 6 from engine 5, to primary pulley 2 as it is, when forward clutch 7b is in engaged state. And then, forward-reverse switching mechanism 7 is configured to transmit the input rotation inputted through torque converter 6 from engine 5, to primary pulley 2 reversely and deceleratingly, when reverse brake 7c is in engaged state. In other words, while reverse brake 7c is in engaged state, rotation speed of the input rotation is decreased, and rotational direction of the input rotation is reversed in forward-reverse switching mechanism 7.

Thereby, rotation inputted to primary pulley 2 is transmitted through V-belt 4 to secondary pulley 3. Then, rotation of secondary pulley 3 is transmitted to drive wheels (not shown) through an output shaft 8, a gear train (or, mechanism) 9, and a differential gear unit 10. Primary pulley 2 includes a fixed sheave 2a and a movable sheave 2b which form (define) the V-shaped groove of primary pulley 2. Secondary pulley 3 includes a fixed sheave 3a and a movable sheave 3b which form the V-shaped groove of secondary pulley 3. Movable sheave 2b can move in an axial direction of primary pulley 2, and movable sheave 3b can move in an axial direction of secondary pulley 3. Since groove width of the V-shaped groove is varied by displacing movable sheave 2b or movable sheave 3b, a rotational transmission ratio (i.e., speed ratio) between primary pulley 2 and secondary pulley 3 can be continuously varied while transmitting the above-described rotational power.

This movable sheave 2b is urged (energized) toward fixed sheave 2a by supplying a primary pressure Ppri adjusted based on a line pressure to a primary (cylinder) chamber 2c of primary pulley 2, and movable sheave 3b is urged to fixed sheave 3a by supplying a secondary pressure Psec adjusted based on the line pressure to a secondary chamber 3c of secondary pulley 3. Namely, primary pressure Ppri and secondary pressure Psec are produced from the line pressure. Thereby, the power transmittal between primary pulley 2 and secondary pulley 3 can be achieved by frictionally engaging V-belt 4 with respective primary pulley 2 and secondary pulley 3, i.e., fixed sheaves 2a and 3a, and movable sheaves 2b and 3b.

Groove width of the V-shaped groove of each pulley 2, 3 is varied in response to pressure difference between primary pressure Ppri and secondary pressure Psec which are produced (adjusted) according to a target speed ratio. Hence, arc radius of winding of V-belt 4 relative to each pulley 2, 3 is continuously varied. In other words, contact radius of V-belt 4 with each pulley 2, 3 is continuously varied. Thereby, the target speed ratio (=target transmission ratio) can be achieved. A shift control hydraulic circuit 11 is configured to control or adjust primary pressure Ppri, secondary pressure Psec, and engagement hydraulic pressures for forward clutch 7b and reverse brake 7c. Forward clutch 7b is engaged when a forward running range is selected, and reverse brake 7c is engaged when a reverse running range is selected. This shift control hydraulic circuit 11 carries out such controls in response to signals from a transmission controller (or, transmission control section) 12.

Transmission controller 12 receives signal from a primary pulley speed sensor 13 sensing rotation speed Npri of primary pulley 2, signal from a secondary pulley speed sensor 14 sensing rotation speed Nsec of secondary pulley 3, signal from a secondary pressure sensor 15 sensing secondary pressure Psec, signal from a primary pressure sensor 16 sensing primary pressure Ppri, signal from an accelerator opening (degree) sensor 17 sensing depression quantity (or, stroke position) APO of an accelerator pedal, selected-range signal from an inhibitor switch 18, and signal relating to transmission input torque (e.g., engine speed or fuel injection time) from an engine controller 19 controlling engine 5.

These shift control hydraulic circuit 11 and transmission controller 12 are configured as shown in FIG. 2. At first, shift control hydraulic circuit 11 will now be explained. This circuit 11 includes an oil pump 21 driven by engine 5; an oil passage (oil duct) 22 which is connected with the outlet of oil pump 21, and through which working fluid is supplied to primary chamber 2c and secondary chamber 3c; a pressure regulator (valve) 23 which regulates a discharge pressure of oil pump 21, namely regulates hydraulic pressure within oil passage 22; and a pressure reducing valve 24 which reduces hydraulic pressure to be supplied to secondary chamber 3c from oil passage 22.

Working fluid within oil passage 22 is regulated (adjusted) to become a predetermined line pressure PL by pressure regulator 23. This line pressure PL within oil passage 22 is regulated by pressure reducing valve 24, and then supplied to secondary chamber 3c as secondary pressure Psec. On the other hand, this line pressure PL within oil passage 22 is regulated by a shift control valve 25, and then supplied to primary chamber 2c as primary pressure Ppri. In addition, pressure regulator 23 and pressure reducing valve 24 are solenoid (controlled) valves. Hence, line pressure PL is controlled (or, regulated) by drive duty for a solenoid 23a of pressure regulator 23, and secondary pressure Psec is controlled by drive duty for a solenoid 24a of pressure reducing valve 24.

Shift control valve 25 has a neutral position 25a, a pressure-increasing position 25b, and a pressure-decreasing position 25c. In order to switch these valve positions of shift control valve 25, shift control valve 25 is coupled with approximately midway point of a shift link 26. Moreover, one end of shift link 26 is coupled with a stepping motor 27 as a shift actuator, and another end of shift link 26 is coupled with movable sheave 2b of primary pulley 2. When stepping motor 27 operates at an operating position shifted (or, advanced) from its base (reference) position by a step number Step corresponding to the target speed ratio, shift link 26 swings on a pivot of connecting portion with (flange of) movable sheave 2b, in response to this operation of stepping motor 27. Thereby, shift control valve 25 is driven so as to change the valve positions thereof from neutral position 25a to pressure-increasing position 25b or pressure-decreasing position 25c.

Thereby, primary pressure Ppri is increased on the basis of line pressure PL, or decreased by drain. Hence, the pressure difference between primary pressure Ppri and secondary pressure Psec is varied, and then causes an up-shift to higher-side speed ratio or a down-shift to lower-side speed ratio. In other words, shift control valve 25 is adapted to adjust the pressure difference between primary pressure Ppri and secondary pressure Psec. Thus, shift motion toward the target speed ratio is started. When this shift motion proceeds, movable sheave 2b of primary pulley 2 moves, and at this time, shift link 26 swings its end coupled with movable sheave 2b, on a pivot of connecting portion with stepping motor 27. Hence, shift link 26 displaces (the valve position of) shift control valve 25 from pressure-increasing position 25b or pressure-decreasing position 25c back to neutral position 25a. Since shift control valve 25 is returned to neutral position 25a at the time of achievement of the target speed ratio, the target speed ratio can be kept (retained).

Drive duty for the solenoid of pressure regulator 23, drive duty for the solenoid of pressure reducing valve 24, and a shift command (i.e., step number Step) for stepping motor 27 are determined or controlled by transmission controller 12. Transmission controller 12 also carries out a control for judging whether or not engagement hydraulic pressure should be supplied to forward clutch 7b or reverse brake 7c shown in FIG. 1. This transmission controller 12 can be functionally separated into a pressure control section (or, means) 12a and a shift control section (or, means) 12b as shown in FIG. 2. Pressure control section 12a determines the solenoid-drive duty of pressure regulator 23 and the solenoid-drive duty of pressure reducing valve 24. Shift control section 12b determines step number Step for driving stepping motor 27, for the shift control.

In the shift control apparatus of this embodiment according to the present invention, transmission controller 12 also includes a fail determining section (or, means) 12c which examines whether or not stepping motor 27 as the shift actuator is under abnormal condition (i.e., failed condition). Namely, fail determining section 12c determines whether stepping motor 27 has a fault such as a break in its harness. In this embodiment, different two controls of a control under normal condition (i.e., good operating condition) and a control under failed condition, are performed in accordance with the result of determination of fail determining section 12c. Namely, the shift control in the case where stepping motor 27 has no fault, is different from the (fail-safe) shift control in the case where stepping motor 27 has a fault.

Further, the (fail-safe) control responsive to the determination of the failed condition starts if a predetermined control start criterion (or, requirement) is satisfied at the time of this fail determination. Detail explanations about this control start criterion will be described later.

In detail, pressure control section 12a includes a basic hydraulic pressure calculating section (or, means) 121 which calculates a basic hydraulic pressure, and a hydraulic pressure command section (or, means) 123, as shown in FIG. 3. Hydraulic pressure command section 123 controls (or, regulates) the secondary pressure by controlling the duty for solenoid 24a of pressure reducing valve 24 by way of feedback control, on the basis of calculation result of basic hydraulic pressure calculating section 121. Moreover, hydraulic pressure command section 123 controls the line pressure by controlling the duty for solenoid 23a of pressure regulator 23, on the basis of calculation result of basic hydraulic pressure calculating section 121.

These functional configurations will now be explained in more detail, mainly in view of the normal control during the normal condition. Basic hydraulic pressure calculating section 121 includes an input torque calculating section (or, means) 121a, a basic secondary thrust calculating section (or, means) 121b, a required thrust difference calculating section (or, means) 121c, a correcting section (or, means) 121d, and a hydraulic pressure converting section (or, means) 121e. Input torque calculating section 121a is configured to calculate an input torque Ti of the transmission 1, namely to primary pulley 2, on the basis of information relating to the input torque (e.g., engine speed or fuel injection time) derived from an engine controller 19 (see FIG. 2). Basic secondary thrust calculating section 121b is configured to calculate a basic secondary thrust, namely a required belt-grasp force (or, contact frictional force) for secondary pulley 3, from transmission input torque Ti calculated by input torque calculating section 121a. Required thrust difference calculating section 121c is configured to calculate a required thrust difference for the shift (i.e., a difference of belt-grasp force between primary pulley 2 and secondary pulley 3, for the shift), from the actual speed ratio sensed by primary pulley speed sensor 13 and secondary pulley speed sensor 14. This required thrust difference for the shift denotes a thrust difference which is needed at the time of execution of the shift. Correcting section 121d is configured to correct the calculated basic secondary thrust on the basis of the required thrust difference. Hydraulic pressure converting section 121e is configured to convert (or transform) the corrected secondary thrust to a required secondary pressure (value) Psec* (i.e., secondary hydraulic pressure needed for the shift (needed at the time of the shift)).

Basic hydraulic pressure calculating section 121 further includes a basic primary thrust calculating section (or, means) 121f, a correcting section (or, means) 121g, and a hydraulic pressure converting section (or, means) 121h. Basic primary thrust calculating section 121f is configured to calculate a basic primary thrust, namely a required belt-grasp force for primary pulley 2, from transmission input torque Ti calculated by input torque calculating section 121a. Correcting section 121g is configured to correct the calculated basic primary thrust on the basis of the required thrust difference for the shift, calculated by required thrust difference calculating section 121c. Hydraulic pressure converting section 121h is configured to convert the corrected primary thrust to a required primary pressure Ppri* (i.e., primary hydraulic pressure needed for the shift).

Hydraulic pressure command section 123 includes a secondary-pressure feedback control section (or, means) 123a, and a secondary-pressure solenoid-current control section (or, means) 123b. Secondary-pressure feedback control section 123a is configured to determine the drive duty of pressure reducing valve 24, so as to bring actual secondary pressure Psec closer to required secondary pressure Psec*, by way of feedback control according to the difference between actual secondary pressure Psec sensed by secondary pressure sensor 15 and required secondary pressure Psec* derived from hydraulic pressure converting section 121e. Secondary-pressure solenoid-current control section 123b is configured to control the current for solenoid 24a of pressure reducing valve 24 by using the drive duty determined by secondary-pressure feedback control section 123a. In addition, solenoid 24a of pressure reducing valve 24 is hereinafter also called a secondary pressure solenoid 24a.

Hydraulic pressure command section 123 further includes a line pressure control section (or, means) 123c, and a primary-pressure solenoid-current control section (or, means) 123d. Line pressure control section 123c is configured to compare required primary pressure Ppri* derived from hydraulic pressure converting section 121h with required secondary pressure Psec* derived from secondary-pressure feedback control section 123a. Then, line pressure control section 123c sets a target line pressure (value) PL* at a value equal to required primary pressure Ppri*, if required primary pressure Ppri* is equal to or higher than required secondary pressure Psec*. Moreover, line pressure control section 123c sets target line pressure PL* at a value equal to required secondary pressure Psec*, if required primary pressure Ppri* is lower than required secondary pressure Psec*. Primary-pressure solenoid-current control section 123d is configured to control the current for solenoid 23a of pressure regulator 23 by using the drive duty determined by line pressure control section 123c. In addition, solenoid 23a of pressure regulator 23 is hereinafter also called a primary pressure solenoid 23a.

Next, shift control section 12b will now be explained in detail. Shift control section 12b, at first, calculates a target input rotation speed (of transmission 1) from a vehicle speed obtained from secondary pulley's rotation speed Nsec, and accelerator pedal's depression quantity APO; with reference to a predetermined relationship such as a map. Then, shift control section 12b calculates the target speed ratio according to a driving state (e.g., vehicle speed and accelerator pedal's depression quantity APO), by dividing this target input rotation speed by secondary pulley's rotation speed Nsec.

Next, shift control section 12b calculates an actual speed ratio by dividing primary pulley's rotation speed Npri by secondary pulley's rotation speed Nsec. Then, shift control section 12b calculates a speed ratio command, which brings the actual speed ratio closer to the target speed ratio at a target shift speed (i.e., target rate of change of the shift with respect to time) while performing a disturbance compensation according to the difference (or, deviation) between the actual speed ratio and the target speed ratio. Thereby, step number Step for stepping motor 27 is calculated to achieve this speed ratio command, and a command of step number Step is outputted to stepping motor 27. Then, the target speed ratio can be achieved by means of the above-described shift motion.

Here, the fail-safe control will now be explained. During the failed condition, shift control section 12b fixes step number Step for stepping motor 27 to allow step number Step to maintain the state at the time of determination of the failed condition. Namely, shift control section 12b carries out a shift-actuator fixing control for fail-safe, without outputting the command for the change of step number Step to stepping motor 27. In other words, shift control section 12b carries out the fail-safe shift-actuator fixing control to fix step number Step for stepping motor 27, under the condition where fail determining section 12c determines that stepping motor 27 is under the failed condition.

Hydraulic pressure command section 123 sets target line pressure PL* to an upper limit pressure (value) within the limitation of strength of V-belt 4. This upper limit pressure (value) within the limitation of strength of V-belt 4 means a maximum pressure within limitation of strength of V-belt 4 (or, a relatively high pressure obtained in consideration of the strength of V-belt 4, for example, an upper limit pressure not to damage V-belt 4). Moreover, hydraulic pressure command section 123 sets required secondary pressure Psec* to its maximum pressure (or, a pressure higher than the upper limit pressure within the limitation of strength of V-belt 4). Then, hydraulic pressure command section 123 prohibits or halts the feedback control for secondary pressure Psec. Thus, hydraulic pressure command section 123 carries out a fail-safe hydraulic control by way of open loop control. Namely, since target line pressure PL* is set at the upper limit pressure within the limitation of strength of V-belt 4, line pressure PL can be increased up to its maximum pressure while protecting V-belt 4. Moreover, since required secondary pressure Psec* is set at the maximum pressure, the pressure reduction by pressure reducing valve 24 is minimized, and thereby secondary pressure Psec can become substantially equal pressure to line pressure PL. Namely, secondary pressure Psec can increase up to substantially equal pressure to line pressure PL. Hence, secondary pressure Psec is controlled so as to become the maximum pressure within the limitation of strength of V-belt 4.

Since this limit pressure within the limitation of strength of V-belt 4 depends on the engine speed and the speed ratio, for example a map based on these dependence can be prepared. By referring to this map, target line pressure PL* corresponding to the limit pressure within the limitation of strength of V-belt 4, can be set in accordance with the engine speed and the speed ratio at that time. The limit pressure within the limitation of strength of V-belt 4 is also briefly called the limit pressure of the belt strength.

As mentioned above, the fail-safe control in this embodiment includes two of the fail-safe shift-actuator fixing control and the fail-safe hydraulic control. The fail-safe hydraulic control is carried out in the wake of the fail-safe shift-actuator fixing control. In this embodiment, the determination of the failed condition starts the shift-actuator fixing control as a fail-safe control. Namely, the determination of the failed condition is a criterion for starting the fail-safe shift-actuator fixing control. In addition to this criterion, the following criterion (a) is set up (is provided) to start the fail-safe shift-actuator fixing control.

(a) A specific control such as a reducing control for reducing hydraulic pressure for the sake of protection of the apparatus, is not currently being carried out.

Hence, while carrying out this reducing control of hydraulic pressure, the control for setting (target) line pressure PL at the limit pressure within the limitation of strength of V-belt 4 and the control for setting secondary pressure Psec at the maximum pressure within the limitation of strength of V-belt 4, are respectively prohibited (see FIG. 3).

A control in a very-low-temperature environment, for example −20~−40° C., is one example corresponding to the hydraulic pressure's reducing control described in criterion (a). In the case where the continuously-variable transmission is used as a transmission for the vehicle, the viscosity of oil becomes high at very low temperature. Accordingly, the resistance of whole hydraulic system becomes high, and then a starting characteristic (performance) of the engine deteriorates due to decrease of a cranking rotation speed (by a starter). As a countermeasure against this deterioration, a minimum control of the line pressure is performed to enhance the starting characteristic of the engine by temporarily adjusting the line pressure to its minimum value thereby reducing drive load of the oil pump, when starting the engine at very low temperature. Moreover, the specific control mentioned in criterion (a) also includes a control for reducing the line pressure at the time of start of the engine, or a control for reducing the line pressure after detecting a first-time belt slip.

The fail-safe hydraulic control executed in this embodiment according to the present invention is the increasing control for increasing hydraulic pressure, as described above. When carrying out this fail-safe control (the increasing control) concurrently with the reducing control for reducing hydraulic pressure, there is possibility that these two controls interfere with each other. Hence, criterion (a) is set up in this embodiment, in order to protect units (or, apparatus) by avoiding such an interference.

In this embodiment, the following criteria (b) and (c) which start the above-described fail-safe hydraulic control during operation of the fail-safe shift-actuator fixing control, are set up (provided) in addition to criterion (a) and the determination of the failed condition.

(b) The condition where the vehicle speed is equal to or lower than a predetermined vehicle speed, has continued for a predetermined time or longer.

(c) The condition where the engine speed is equal to or lower than a predetermined engine speed, has continued for a predetermined time or longer.

It is noted that the criteria (b) and (c) are examined, on the precondition that sensing sections for sensing these engine speed and vehicle speed are normal (not failed).

By the examination of criterion (b), the fail-safe control which adjusts (brings) the speed ratio to (its value for) lower vehicle speed side is carried out only when the vehicle's running speed is relatively low. Hence, the occurrence of a sudden engine brake caused by adjusting the speed ratio to lower vehicle speed side while the vehicle is running at high speed, can be avoided. Therefore, running (driving) performance of the vehicle can be secured.

By the examination of criterion (c), the fail-safe control which adjusts the speed ratio to (speed ratio value for) lower vehicle speed side is carried out only when the engine speed is relatively low. Hence, an engine's over revving caused by adjusting the speed ratio to lower vehicle speed side when the engine speed is high, can be avoided. Therefore, running performance of the vehicle can be secured.

In this embodiment, the output rotation of the engine is inputted to the primary pulley, and is changed in rotation speed between the primary pulley and the secondary pulley, and then is outputted to drive wheels of the vehicle from the secondary pulley. The engine speed can be recognized as (obtained from) the rotation speed of the primary pulley. The vehicle speed (=rotation speed of the drive wheel) can be recognized as the rotation speed of the secondary pulley. Hence, a primary-pulley speed sensing section (primary pulley speed sensor 13) for sensing rotation speed of the primary pulley is used as the engine speed sensing section, and a secondary-pulley speed sensing section (secondary pulley speed sensor 14) for sensing rotation speed of the secondary pulley is used as the vehicle speed sensing section. Namely, the fail-safe (hydraulic) control is carried out on the basis of the criterion that the primary pulley's rotation speed sensed by the primary-pulley speed sensing section is equal to or lower than the (first) predetermined rotation speed, and the criterion that the secondary pulley's rotation speed sensed by the secondary-pulley speed sensing section is equal to or lower than the (second) predetermined rotation speed. In other words, shift control section 12b carries out the fail-safe hydraulic control to bring line pressure PL to upper limit pressure within limitation of strength of belt 4 and bring secondary pressure Psec to its maximum pressure, under the condition where control-start criteria (b) and (c) predetermined to secure driving performance of the vehicle are satisfied at the time of the failed condition.

Since the shift control apparatus in this embodiment according to the present invention is configured as described above, the fail-safe control during failed condition of stepping motor 27 is carried out, for example, as shown in FIG. 4. Namely, transmission controller 12 examines (determines) whether or not the criterion (a) is satisfied (met), namely whether the control for reducing hydraulic pressure (for the sake of protection of the apparatus) is being carried out, at a step S10. For example, transmission controller 12 examines whether the line pressure's minimum control for reducing the drive load for oil pump 21 and thereby improving the starting performance of engine 5 at very low temperature, is during operation, or not.

If the line pressure's minimum control is currently being carried out, transmission controller 12 does not carry out any process relevant to the fail-safe control. Namely, transmission controller 12 carries out the hydraulic-pressure reducing control such as the line pressure's minimum control, under a specific condition. During execution of this reducing control, transmission controller 12 prohibits execution of any process relevant to the fail-safe control, and thereby gives a priority to the hydraulic-pressure reducing control. On the other hand, if the line pressure's minimum control is not currently being carried out, fail determining section 12c determines whether or not stepping motor 27 is under failed condition, at a step S20. If stepping motor 27 is under failed condition, namely YES at step S20, shift control section 12b fixes step number Step for stepping motor 27 to maintain the state (of step number Step) at the time of determination of the failed condition, at a step S30.

At a step S40, transmission controller 12 determines whether or not both of the criteria (b) and (c) are satisfied, namely whether the condition where the engine speed (=rotation speed of primary pulley 2) is equal to or lower than predetermined speed $\epsilon 1$, and the condition where the vehicle speed (=rotation speed of secondary pulley 3) is equal to or lower than predetermined speed $\epsilon 2$ have continued (elapsed) for a predetermined time. Then, at a step S50, transmission controller 12 determines whether or not the sensing sections for sensing the engine speed and the vehicle speed, i.e., primary pulley speed sensor 13 and secondary pulley speed sensor 14 are under normal operating condition (not failed). If primary pulley speed sensor 13 and secondary pulley speed sensor 14 are under normal condition, and the condition where the engine speed is equal to or lower than predetermined speed 11, and the condition where the vehicle speed is equal to or lower than predetermined speed $\epsilon 2$ have continued for the predetermined time (period); then transmission controller 12 set (or, bring) line pressure PL to the upper limit pressure within limitation of the belt strength, at a step S60. Moreover, as a matter of course, transmission controller 12 halts the secondary-pressure feedback control at a step S70. Then controller 12 carries out respective hydraulic controls, and sets secondary pressure Psec to the maximum pressure MAX at a step S80.

By fixing stepping motor 27 as described above when stepping motor 27 fails, sudden downshift can be prevented. Thereby, sudden deceleration of the vehicle, namely occurrence of unnatural behavior of the vehicle can be prevented. In addition to this, secondary pressure Psec is adjusted to its maximum value, and line pressure PL is adjusted to the upper limit pressure within limitation of the belt strength, under the condition where the engine speed is at or below predetermined rotation speed $\epsilon 1$ (relatively low speed) and the vehicle speed is at or below predetermined vehicle speed $\epsilon 2$ (relatively low speed). Hence, secondary pressure Psec is adjusted to the maximum pressure within limitation of the belt strength, and thereby the speed ratio is varied toward lower vehicle speed side (downshift side).

For example, the fail-safe control is performed as shown in FIG. 5. At first, at an instant t1, the engine speed becomes relatively low speed equal to or lower than predetermined speed $\epsilon 1$, and the vehicle speed becomes relatively low speed equal to or lower than predetermined vehicle speed $\epsilon 2$. At an instant t2, the predetermined time has elapsed from the instant t1, with the above condition kept. Hence, secondary pressure Psec is adjusted to its maximum value, and line pressure PL is adjusted to the upper limit pressure within limitation of the belt strength. As shown by a solid line of FIG. 5, actual secondary pressure Psec in this fail-safe hydraulic control rises more than in the case where this fail-safe control is not carried out (see a broken line of FIG. 5). On the other hand, primary pressure Ppri does not vary. Thereby, the speed ratio (=pulley ratio) varies to downshift side.

Afterward, the vehicle stops at an instant t3. At the instant t3, the speed ratio has become a value suitable for low vehicle speed. Therefore, the vehicle can start moving under the condition where the speed ratio is suitable for low vehicle speed, when starting after the instant t3. Namely, in this embodiment, the vehicle can smoothly start when the vehicle starts after coming to a full stop. Moreover, this fail-safe hydraulic control (namely, the hydraulic control which brings secondary pressure Psec to its maximum and brings line pressure PL to the upper limit pressure within limitation of the belt strength) is carried out; when the criterion that the engine speed has become equal to or lower than predetermined speed $\epsilon 1$, and the criterion that the vehicle speed has become equal to or lower than predetermined vehicle speed $\epsilon 2$ are respectively satisfied. Hence, driving performance of the vehicle can be enhanced or secured; since over revving of the engine, which is caused by adjusting the speed ratio to (its value for) lower vehicle speed side under the condition of high engine speed, is avoided. Moreover, driving performance of the vehicle can be enhanced or secured; since the occurrence of sudden engine brake, which is caused by adjusting the speed ratio to its value for lower vehicle speed side under the condition of high running speed of the vehicle, is avoided.

Furthermore, this fail-safe control for increasing hydraulic pressure is not performed, while the reducing control for reducing hydraulic pressure, e.g. to protect the apparatus, is being carried out. Hence, the interference between these two controls can be avoided, thereby respective units (apparatus) can be protected (from various undesired operations).

In this embodiment, stepping motor 27 corresponds to the shift actuator (or, a shift actuating means) to vary the speed ratio by varying the groove width of at least one of primary pulley 2 and secondary pulley 3. Pressure regulator 23 corresponds to a line pressure adjusting section to adjust line pressure PL. Pressure reducing valve 24 corresponds to a secondary-pressure adjusting section to adjust secondary pressure Psec. Transmission controller 12 corresponds to a control section to control the shift actuator, the line pressure adjusting section, and the secondary-pressure adjusting section. Primary pressure sensor 16 corresponds to a primary pressure sensing section to sense (actual) primary pressure Ppri. Secondary pressure sensor 15 corresponds to a secondary pressure sensing section to sense (actual) secondary pressure Psec. Basic hydraulic pressure calculating section 121 corresponds to a required primary pressure setting section to set required primary pressure Ppri*, and a required secondary pressure setting section to set required secondary pressure Psec*.

In addition, some advantages and operations with reference to this embodiment according to the present invention will now be described. In this embodiment, when the rotation inputted to primary pulley 2 is transmitted through V-belt 4 to secondary pulley 3 and is outputted to drive wheels, groove widths of primary pulley 2 and secondary pulley 3 are varied as appropriate by the shift actuator and so on. Hence, the rotation inputted to primary pulley 2 changes in speed, in accordance with speed ratio corresponding to these groove widths. Under the condition where fail determining section 12c determines that the shift actuator is under the failed condition, transmission controller 12 carries out the fail-safe shift-actuator fixing control to fix the shift actuator (namely, outputs no operation command for the shift actuator). Moreover, transmission controller 12 carries out the fail-safe hydraulic control to bring line pressure PL to upper limit pressure (value) within limitation of the belt strength and bring secondary pressure Psec to its maximum pressure (value), under the condition where the control-start criterion predetermined to secure driving performance of the vehicle is satisfied at the time of the failed condition. Namely, the upper limit value of line pressure PL is limited to a pressure value within limitation of the belt strength. Hence, secondary pressure Psec is increased to maximum pressure within limitation of the belt strength. Since secondary pressure Psec rises regardless of the fixing of the shift actuator, the groove width of secondary pulley 3 is narrowed and the groove width of primary pulley 2 is relatively expanded, thereby the speed ratio is varied to lower vehicle speed side. By employing such a control-start criterion, the speed ratio can be varied into relatively low state (i.e., speed ratio for relatively low vehicle speed) with driving performance of the vehicle being secured.

It is favorable that this control-start criterion includes the state where the vehicle speed is equal to or lower than a predetermined vehicle speed. By examination of this control-start criterion, the fail-safe control which adjusts the speed ratio to (its value for) lower vehicle speed side is carried out only in the case where the vehicle's running speed is relatively low. Hence, the occurrence of a sudden engine brake caused by adjusting the speed ratio to lower vehicle speed side while the vehicle is running at high speed, can be prevented. Therefore, driving performance of the vehicle can be secured.

Moreover, it is favorable that this control-start criterion includes the state where the engine speed is equal to or lower than a predetermined engine speed. By examination of this control-start criterion, the fail-safe control which adjusts the speed ratio to lower vehicle speed side is carried out only in the case where the engine speed is relatively low. Hence, an engine's over revving caused by adjusting the speed ratio to lower vehicle speed side when the engine speed is high, can be prevented. Therefore, driving performance of the vehicle can be maintained with engine 5 being protected.

Furthermore, it is favorable that transmission controller 12 brings the actual secondary pressure sensed by the secondary pressure sensing section closer to the required secondary pressure set by the required secondary pressure setting section by way of feedback control, under the normal condition where fail determining section 12c determines that the shift actuator is not under the failed condition; and transmission controller 12 halts the feedback control and carry out the respective fail-safe controls, under the condition where fail determining section 12c determines that the shift actuator is under the failed condition. Thereby, the interference between the feedback control of secondary pressure Psec in the normal condition and the respective fail-safe controls in the failed condition, can be avoided.

Furthermore, it is favorable that transmission controller 12 is configured to carry out the hydraulic pressure reducing control to reduce hydraulic pressure for the sake of protection of the apparatus, under the specific condition; and transmission controller 12 is configured to prohibit execution of the respective fail-safe controls (i.e., transmission controller 12 does not carry out the respective fail-safe controls) and thereby give a priority to the hydraulic pressure reducing control, when fail determining section 12c determines, during execution of the hydraulic pressure reducing control, that the shift actuator is under the failed condition. This specific condition for carrying out the hydraulic pressure reducing control is, for example, the condition in a very-low-temperature environment, e.g., −20∼−40° C. In the case where the continuously-variable transmission is used as a transmission for a vehicle, the viscosity of oil becomes high at very low temperature. Accordingly, the resistance of whole hydraulic system becomes high, and then a starting characteristic of the engine deteriorates due to decrease of the cranking rotation speed (by a starter). As a countermeasure against this deterioration, a minimum control for the line pressure is performed to enhance the starting characteristic of the engine by temporarily adjusting the line pressure to its minimum value thereby reducing drive load for the oil pump, when starting the engine at very low temperature. Moreover, this hydraulic pressure reducing control also includes a control for reducing the line pressure at the time of start of the engine, or a control for reducing the line pressure after detecting a first-time belt slip.

Furthermore, it is favorable that the line pressure adjusting section and the secondary-pressure adjusting section are solenoid valves. Thereby, the respective fail-safe controls can be achieved easily. Moreover, it is favorable that the shift actuator is the stepping motor coupled with movable sheave 2b of primary pulley 2, and coupled with shift control valve 25 adapted to adjust the pressure difference between primary pressure Ppri and secondary pressure Psec, through shift link 26.

This application is based on a prior Japanese Patent Application No. 2004-275620 filed on Sep. 22, 2004. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A shift control apparatus for a continuously-variable transmission, comprising:
   a primary pulley coupled with an engine for a vehicle, and adapted to vary groove width thereof in accordance with hydraulic pressure within a primary chamber;
   a secondary pulley connected with the primary pulley by a belt, and adapted to vary groove width thereof in accordance with hydraulic pressure within a secondary chamber;
   a stepping motor that operates as a shift actuator adapted to vary a speed ratio by varying the groove width of at least one of the primary pulley and the secondary pulley;
   a line pressure adjusting section adapted to adjust a discharge pressure of an oil pump, to produce a line pressure from which the hydraulic pressures within the primary and secondary chambers are produced;
   a secondary-pressure adjusting section adapted to adjust a secondary pressure corresponding to the hydraulic pressure within the secondary chamber, on the basis of the line pressure; and
   a control section configured to control the shift actuator, the line pressure adjusting section, and the secondary-pressure adjusting section, the control section including
   a fail determining section configured to determine whether the shift actuator is under a failed condition, and the control section being configured to carry out a fail-safe shift-actuator fixing control to fix an operating state of the shift actuator, under the condition where the fail determining section determines that the shift actuator is under the failed condition, and being configured to carry out a fail-safe hydraulic control to bring the line pressure to its upper limit pressure and bring the secondary pressure to its maximum pressure, under the condition where a control-start criterion predetermined to secure driving performance of the vehicle is satisfied at the time of the failed condition.

2. The shift control apparatus as claimed in claim 1, wherein the upper limit pressure of the line pressure is a maximum pressure within limitation of strength of the belt.

3. The shift control apparatus as claimed in claim 1, wherein the control section is configured to carry out the fail-safe hydraulic control, by setting a target line pressure value for the line pressure adjusting section to the upper limit pressure, and by setting a required secondary pressure value for the secondary-pressure adjusting section to its maximum pressure.

4. The shift control apparatus as claimed in claim 1, wherein the control-start criterion is a state where a vehicle speed is equal to or lower than a predetermined vehicle speed.

5. The shift control apparatus as claimed in claim 1, wherein the control-start criterion is a state where an engine speed is equal to or lower than a predetermined engine speed.

6. The shift control apparatus as claimed in claim 1, wherein the control-start criterion is a state where a vehicle speed is equal to or lower than a predetermined vehicle speed and an engine speed is equal to or lower than a predetermined engine speed.

7. The shift control apparatus as claimed in claim 6, wherein the control-start criterion is that the state has continued for a predetermined time.

8. The shift control apparatus as claimed in claim 1, wherein the shift control apparatus further comprises
a secondary pressure sensing section configured to sense an actual secondary pressure, and the control section further includes
a required secondary pressure setting section configured to set a required secondary pressure, in accordance with the state of an input torque to the primary pulley and an actual speed ratio; and wherein
the control section is configured to bring the actual secondary pressure sensed by the secondary pressure sensing section closer to the required secondary pressure set by the required secondary pressure setting section by way of feedback control, under the normal condition where the fail determining section determines that the shift actuator is not under the failed condition, and
the control section is configured to halt the feedback control and carry out the respective fail-safe controls, under the condition where the fail determining section determines that the shift actuator is under the failed condition.

9. The shift control apparatus as claimed in claim 8, wherein the control section further includes
a required primary pressure setting section configured to set a required primary pressure in accordance with the state of the input torque to the primary pulley and the actual speed ratio; and
the control section is configured to control the line pressure adjusting section and the secondary-pressure adjusting section, in accordance with the required secondary pressure set by the required secondary pressure setting section and the required primary pressure set by the required primary pressure setting section, under the normal condition where the fail determining section determines that the shift actuator is not under the failed condition.

10. The shift control apparatus as claimed in claim 1, wherein the control section is configured to carry out a hydraulic pressure reducing control to reduce hydraulic pressure for the sake of protection of the apparatus, under a specific condition; and the control section is configured to prohibit execution of the respective fail-safe controls and thereby give a priority to the hydraulic pressure reducing control, when the fail determining section determines, during execution of the hydraulic pressure reducing control, that the shift actuator is under the failed condition.

11. The shift control apparatus as claimed in claim 1, wherein the line pressure adjusting section and the secondary-pressure adjusting section are solenoid valves.

12. The shift control apparatus as claimed in claim 1, wherein the shift control apparatus further comprises
a shift control valve adapted to adjust a pressure difference between a primary pressure corresponding to the hydraulic pressure within the primary chamber and the secondary pressure; and
the shift actuator is a stepping motor coupled with the shift control valve and a movable sheave of the primary pulley through a link.

13. A shift control apparatus for a continuously-variable transmission, comprising:
a primary pulley coupled with an engine for a vehicle, and adapted to vary groove width thereof in accordance with hydraulic pressure within a primary chamber;
a secondary pulley connected with the primary pulley by a belt, and adapted to vary groove width thereof in accordance with hydraulic pressure within a secondary chamber;
a stepping motor that operates as a shift actuator adapted to vary a speed ratio by varying the groove width of at least one of the primary pulley and the secondary pulley;
line pressure adjusting means for adjusting a discharge pressure of an oil pump, to produce a line pressure from which the hydraulic pressures within the primary and secondary chambers are produced;
secondary pressure adjusting means for adjusting a secondary pressure corresponding to the hydraulic pressure within the secondary chamber, on the basis of the line pressure; and
control means for controlling the shift actuator, the line pressure adjusting means, and the secondary-pressure adjusting means, the control means including
fail determining means for determining whether the shift actuator is under a failed condition, and
the control means being configured to carry out a fail-safe shift-actuator fixing control to fix an operating state of the shift actuator, under the condition where the fail determining means determines that the shift actuator is under the failed condition, and being configured to carry out a fail-safe hydraulic control to bring the line pressure to its upper limit pressure and bring the secondary pressure to its maximum pressure, under the condition where a control-start criterion predetermined to secure driving performance of the vehicle is satisfied at the time of the failed condition.

14. A shift control method for a continuously-variable transmission including:
- a primary pulley coupled with an engine for a vehicle, and adapted to vary groove width thereof in accordance with hydraulic pressure within a primary chamber;
- a secondary pulley connected with the primary pulley by a belt, and adapted to vary groove width thereof in accordance with hydraulic pressure within a secondary chamber; and
- a stepping motor that operates as a shift actuator adapted to vary a speed ratio by varying the groove width of at least one of the primary pulley and the secondary pulley, the shift control method comprising:
- determining whether the shift actuator is under a failed condition;
- carrying out a fail-safe shift-actuator fixing control to fix an operating state of the shift actuator, when the shift actuator is under the failed condition;
- determining whether a control-start criterion predetermined to secure driving performance of the vehicle is satisfied at the time of the failed condition; and
- carrying out a fail-safe hydraulic control to bring a line pressure from which the hydraulic pressures within the primary and secondary chambers are produced, to its upper limit pressure, and to bring hydraulic pressure within the secondary chamber to its maximum pressure, under the condition where the control-start criterion is satisfied at the time of the failed condition.

* * * * *